Dec. 21, 1926.  
M. LESKIEWICZ ET AL  
1,611,465  
PICTURE FRAME AND METHOD OF MAKING THE SAME  
Filed Feb. 17, 1926
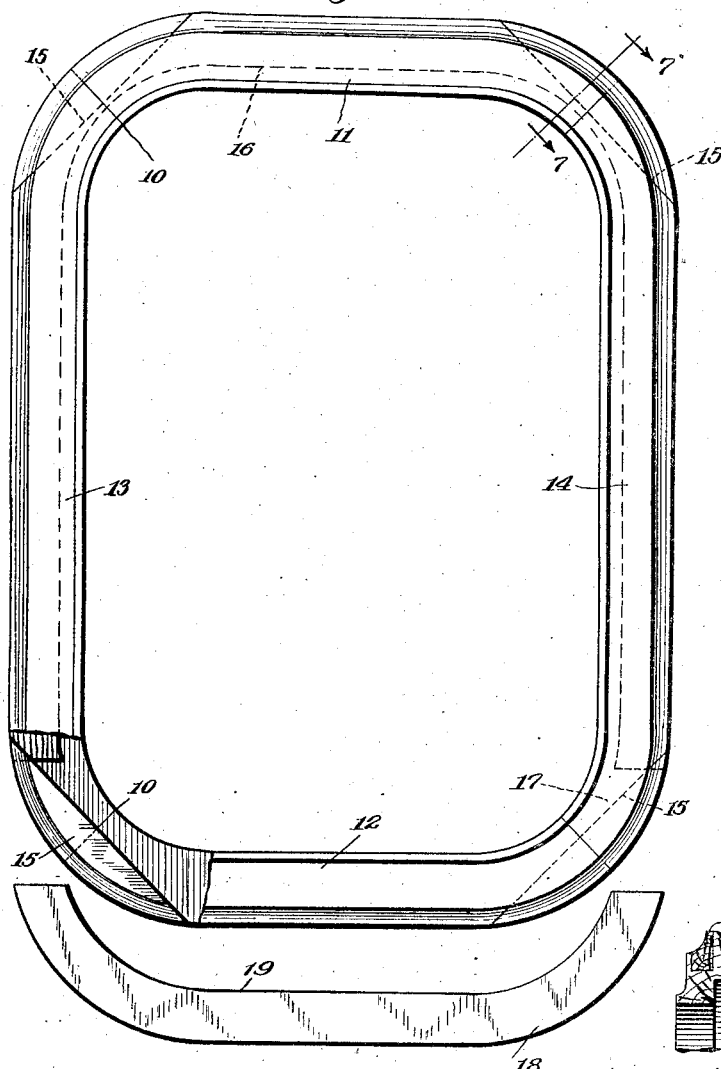
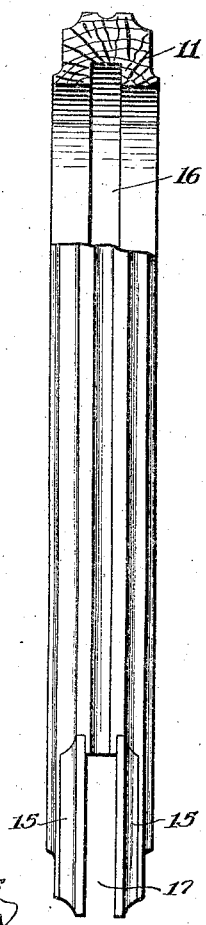
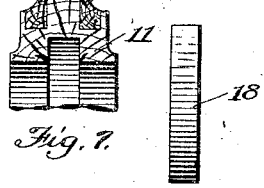
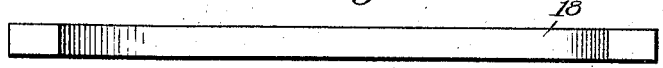
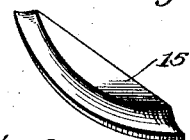
Inventors.  
M. Leskiewicz  
W. Bartkowiak  
By  
Atty.

Patented Dec. 21, 1926.

1,611,465

UNITED STATES PATENT OFFICE.

MICHAEL LESKIEWICZ AND WOJCIECH BARTKOWIAK, OF CHICAGO, ILLINOIS.

PICTURE FRAME AND METHOD OF MAKING THE SAME.

Application filed February 17, 1926. Serial No. 88,795

The invention relates to picture frames and the main object of the invention is the provision of a frame which may be adapted to receive two pictures one of which can be viewed from either side of the frame.

Another object of the invention is the provision of a picture frame into which pictures and glass covers may be easily inserted and held therewithin by suitable means.

A further object of the invention is to provide simple means for strengthening the corners of the frame.

A still further object of the invention is the provision of a simple method whereby the frame of the type indicated may be manufactured.

With the above general objects in view and others that will appear as the nature of the invention is better understood, the same consists in the novel construction, combination and arrangement of parts hereinafter more fully described, illustrated in the accompanying drawings and pointed out in the appended claims.

In the drawing forming a part of this application, and in which like designating characters refer to corresponding parts throughout the several views, Fig. 1 is a front elevational view of the frame, one corner of which is shown in section;

Fig. 2 is a front view of a plug cooperating with the frame;

Fig. 3 is a side view of the frame, partly in section;

Fig. 4 is the end view of the plug;

Fig. 5 is the top view of the plug;

Fig. 6 is the perspective of one of the locking members associated with the corners of the frame; and Fig. 7 is a cross-sectional view through the corner of the frame on line 7—7 of Fig. 1.

Referring in detail to the invention illustrated in the drawing, four bars are employed, beveled at their ends and then glued together at the beveled ends as at 10 to form a rectangular figure as illustrated on Fig. 1. The edges of the figure are then properly shaped and corners rounded.

Fig. 1 illustrates the frame when already shaped and molded, where the shorter sides of the frame are marked 11 and 12 and the longer 13 and 14. Before the outside edge of the frame is finished and molded two parallel recesses at each corner are made and locking members inserted therein for strengthening the corners. Thereupon the outside edge is molded as appears from Fig. 3.

When the outside edge of the frame has been molded and corners rounded the said locking members, indicated by 15, will assume substantially segmental shapes as plainly seen on Fig. 6.

Thereupon, on the inner periphery of the frame and centrally of each side thereof a rabbet 16 is made wherein pictures and glass covers are accommodated. A U-shaped slot 17 is then made in the bottom side 12 and in the ends of sides 13 and 14 of the frame and between the corner locking members 15 for inserting therethrough pictures and glass covers, and to prevent their falling out a U-shaped plug 18 corresponding in shape to slot 17 is inserted therewithin where it is frictionally held. It will be noted that by extending the ends of the plug 18 between the spaced, parallel corner locking members 15 that the structure of the frame is adapted to not only accommodate the plug, but to accommodate it without undue weakening of its structure; i. e. since the grain of the material of the frame at the corners is crossed with respect to the grain of the material of the two locking members, the extending of the curved ends of the plug therebetween will not have a tendency to cause cracking of the frame under stress, or if slightly warped, or if there is any wedging action.

It is observed that plug 18 is narrower than the sides of the frame, so that when it is in position within slot 17 the inner face 19 thereof forms a continuation of the corresponding face of the rabbet 16.

While there is described herein a preferred embodiment of the present invention, it is nevertheless to be understood that minor changes may be made therein without departing from the spirit and scope of the invention as claimed.

What we claim as new is:

1. A picture frame of the type wherein a plurality of pictures may be displayed, one from either of the sides of the frame; comprising a plurality of bars forming the top, bottom and sides of the frame and meeting at their ends to form the corners of the frame; one of said bars and the corners of the frame adjacent thereto being slotted to permit insertion of a picture therethrough; the respective meetings ends of the bars at the corners of the frame and each of the sides of the slotted portion having a plurality of recesses; and locking members carried in the recesses for securing the bars together and preventing cracking of the material of the frame.

2. A picture frame of the type wherein a plurality of pictures may be displayed, one from either of the sides of the frame; comprising a plurality of bars forming the top, bottom and sides of the frame and meeting at their ends to form the corners of the frame; one of said bars and the corners of the frame adjacent thereto being slotted to permit insertion of a picture therethrough; a plug for insertion in the slot; the inner faces of the remaining bars being rabbeted to retain the picture; a plurality of relatively parallel recesses formed in the respective meeting ends of the bars at the corners of the frame and on each of the sides of the slotted portion and rabbeted portion; and locking members carried in the recesses for securing the bars together and preventing cracking of the material of the frame.

3. A picture frame of the type wherein a plurality of pictures may be displayed, one from either of the sides of the frame; comprising a plurality of bars the ends of each of which are curved in the same direction; said bars forming the top, bottom and sides of the frame and meeting at their ends to form the rounded corners of the frame; the bottom bar and the corners of the frame adjacent thereto being slotted to permit insertion of a picture therethrough; a plug for insertion in the slot, the inner faces of the remaining bars being rabbeted to retain the picture; a pair of spaced, parallel recesses formed in the respective meeting ends of the bars at the corners of the frame and one of each of said pairs located on each of the sides of the slotted portion and rabbeted portion; and locking members carried in the recesses for securing the bars together and preventing cracking of the material of the frame.

In testimony whereof we affix our signatures.

MICHAEL LESKIEWICZ.
WOJCIECH BARTKOWIAK.